United States Patent
Kakinuma et al.

(10) Patent No.: US 11,795,349 B2
(45) Date of Patent: Oct. 24, 2023

(54) ADHESIVE SHEET

(71) Applicant: 3M INNOVATIVE PROPERTIES COMPANY, Saint Paul, MN (US)

(72) Inventors: Yoshiteru Kakinuma, Tokyo (JP); Aizoh Sakurai, Tokyo (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 322 days.

(21) Appl. No.: 16/957,855

(22) PCT Filed: Jan. 3, 2019

(86) PCT No.: PCT/IB2019/050023
§ 371 (c)(1),
(2) Date: Jun. 25, 2020

(87) PCT Pub. No.: WO2019/135175
PCT Pub. Date: Jul. 11, 2019

(65) Prior Publication Data
US 2021/0054240 A1  Feb. 25, 2021

(30) Foreign Application Priority Data

Jan. 4, 2018  (JP) .................................. 2018-000209

(51) Int. Cl.
*C08G 18/10* (2006.01)
*C08G 18/72* (2006.01)
(Continued)

(52) U.S. Cl.
CPC .............. *C09J 7/205* (2018.01); *C08G 18/10* (2013.01); *C08G 18/72* (2013.01); *C08G 18/83* (2013.01);
(Continued)

(58) Field of Classification Search
CPC ... C09J 7/205; C09J 7/25; C09J 183/04; C09J 2301/122; C09J 2475/006; C09J 2483/00; C08G 18/10; C08G 18/72; C08G 18/83
See application file for complete search history.

(56) References Cited

U.S. PATENT DOCUMENTS

| | | |
|---|---|---|
| 4,861,820 A | 8/1989 | Toyoda |
| 2003/0165676 A1 | 9/2003 | Zhou |

(Continued)

FOREIGN PATENT DOCUMENTS

| | | |
|---|---|---|
| CA | 2122973 | 5/1998 |
| JP | H09-509198 A | 9/1997 |

(Continued)

OTHER PUBLICATIONS

International Search Report for PCT International Application No. PCT/IB2019/050022, dated May 9, 2019, 4 pages.

(Continued)

*Primary Examiner* — David Sample
*Assistant Examiner* — Donald M Flores, Jr.
(74) *Attorney, Agent, or Firm* — 3M Innovative Properties Company

(57) ABSTRACT

The disclosed adhesive sheet exhibits high anchoring performance and where separation between the substrate and the adhesive layer substantially does not occur when unwinding or re-peeling in actual applications. The adhesive sheet comprises a substrate including a urethane polymer component at least at a portion of a surface and a silicone adhesive layer that is in contact with the urethane polymer component, wherein the urethane polymer having a chain extender-derived hard segment and a polyoxyalkylene polyol-derived soft segment.

15 Claims, 2 Drawing Sheets

(51) Int. Cl.
    *C08G 18/83* (2006.01)
    *C09J 7/20* (2018.01)
    *C09J 7/25* (2018.01)
    *C09J 183/04* (2006.01)

(52) U.S. Cl.
    CPC ............... *C09J 7/25* (2018.01); *C09J 183/04* (2013.01); *C09J 2301/122* (2020.08); *C09J 2475/006* (2013.01); *C09J 2483/00* (2013.01)

(56) References Cited

U.S. PATENT DOCUMENTS

| | | |
|---|---|---|
| 2007/0259163 A1 | 11/2007 | Connolly |
| 2012/0202053 A1 | 8/2012 | Iseki |
| 2013/0302602 A1 | 11/2013 | Takeda |
| 2014/0330235 A1* | 11/2014 | Swaniker ............ A61L 26/0066 521/159 |
| 2014/0349108 A1* | 11/2014 | Fung .................. A61L 15/58 428/355 R |
| 2016/0124376 A1 | 5/2016 | Ito |
| 2018/0134924 A1 | 5/2018 | Sakurai |

FOREIGN PATENT DOCUMENTS

| | | |
|---|---|---|
| JP | 2000-225184 A | 8/2000 |
| JP | 2011-219549 | 11/2011 |
| JP | 2012-017166 | 1/2012 |
| KR | 10-2014-0067571 A | 6/2014 |
| WO | WO 92/06139 | 4/1992 |
| WO | WO 2009/094332 | 7/2009 |
| WO | WO 2010-056544 | 5/2010 |
| WO | WO 2010-056546 | 5/2010 |
| WO | WO 2013-096535 | 6/2013 |
| WO | WO 2016-018749 | 2/2016 |
| WO | WO 2016-191235 | 12/2016 |
| WO | WO 2016-191236 | 12/2016 |
| WO | WO 2019-135174 | 7/2019 |

OTHER PUBLICATIONS

International Search Report for PCT International Application No. PCT/IB2019/050023, dated May 13, 2019, 4 pages.
Datta, Janusz, et al., Synthesis, structure and properties of poly(ether-urethane)s synthesized using a trifunctional oxypropylated glycerol as a polyol, Journal of Thermal Analysis and Calorimetry, NL, Apr. 2017, vol. 128, No. 1, p. 155-167.

* cited by examiner

ADHESIVE SHEET

CROSS REFERENCE TO RELATED APPLICATIONS

This application is a national stage filing under 35 U.S.C. 371 of PCT/IB2019/050023, filed Jan. 2, 2019, which claims the benefit of Japanese Application No. 2018-000209, filed Jan. 4, 2018, the disclosures of which are incorporated by reference in their entirety herein.

TECHNICAL FIELD

The present disclosure relates to an adhesive sheet.

BACKGROUND

Numerous types of adhesives such as acrylic-based, silicone-based and natural rubber-based adhesives are known as adhesives that can be used to make adhesive sheets. Cross-linked adhesives can be used, and as one crosslinking method, radiation crosslinking such as electron beam crosslinking may be used.

SUMMARY

Adhesive sheets are often provided in a roll form, namely as an adhesive tape. To unwind the tape, the adhesive layer is detached from a substrate, and remains on an adjacent tape back surface. Furthermore, in a case where an adhesive sheet is temporarily affixed to skin or another adherend and then later detached, the substrate and adhesive layer separate when detaching, and only the adhesive layer remains on the adherend.

The disclosed adhesive sheet exhibits high anchoring performance (anchor effect) and in which separation between the substrate and the adhesive layer substantially does not occur when unwinding or re-peeling in actual applications.

In one embodiment, the adhesive sheet comprises a substrate including a urethane polymer component at least at a portion of a surface; and a silicone adhesive layer that is laminated so as to contact the urethane polymer component; the urethane polymer having a chain extender-derived hard segment and a polyoxyalkylene polyol-derived soft segment.

The adhesive sheet exhibits excellent adherence, or in other words, high anchoring performance (anchor effect) between the silicone adhesive and the substrate, and in actual applications, separation between the substrate and the adhesive layer substantially does not occur when unwinding or re-peeling. With primers that have been used to improve anchoring performance, stickiness may occur, but with the disclosed adhesive sheet, this type of phenomenon is not observed.

The chain extender may be an organic compound having 1 to 6 carbons and 2 active hydrogen groups, and the polyoxyalkylene polyol may be a polyoxyalkylene diol with an alkylene portion having from 2 to 6 carbons. An adhesive sheet having this type of configuration can enhances the anchoring performance. The chain extender and the polyoxyalkylene polyol may be linear or branched.

A layer of the urethane polymer component may be formed on the substrate, or the urethane polymer component may be present internally and on the surface of the substrate. A fabric is useful as the substrate, and the silicone adhesive is preferably a crosslinked silicone adhesive.

DETAILED DESCRIPTION

Figure 1:
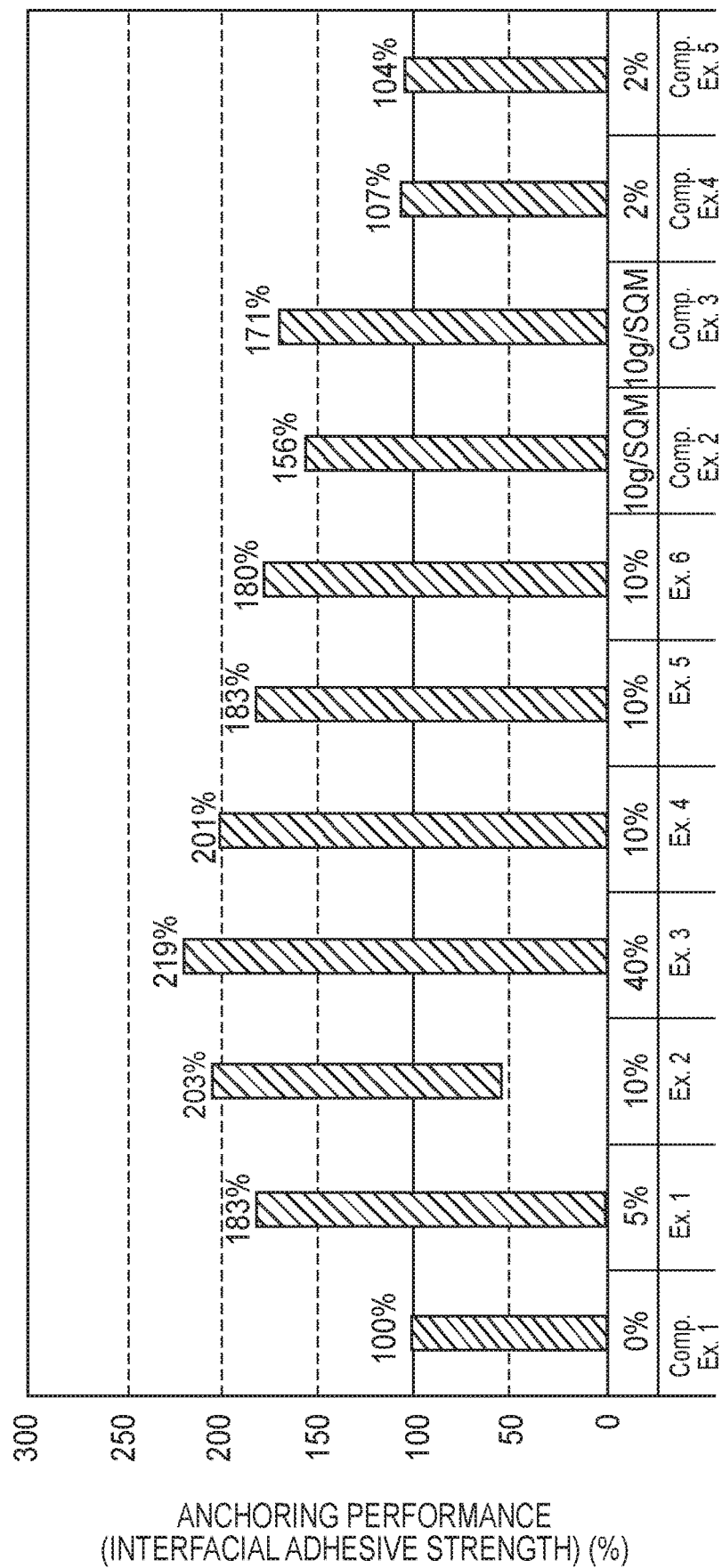
FIG. 1 is a graph showing the results of examples.

In one embodiment, an adhesive sheet comprises a substrate including a urethane polymer component at least at a portion of a surface and a silicone adhesive layer that is in contact with the urethane polymer component. The adhesive sheet may be shaped in the form of a sheet, and a tape-shaped adhesive sheet, namely an adhesive tape, is also included in adhesive sheets. The adhesive tape may be provided in an unwound shape.

With the adhesive sheet, the urethane polymer component need only be formed at least at a portion of the surface of the substrate, and therefore cases in which the substrate is a film for example include forms such as (a) a form for which a layer made from the urethane polymer component is formed on the entire surface of the substrate, (b) a form for which a layer made from the urethane polymer component is formed on a portion of the surface, and (c) a form for which urethane polymer is contained in the material configuring the film-shaped substrate, and the urethane polymer is exposed at a portion or at the entirety of the surface.

Cases in which the substrate is a fabric (the significance of fabric will be described below) include forms such as (d) a form for which the entire surface of the fabric is covered by a layer made from the urethane polymer component, (e) a form for which a portion of the fabric is covered by a layer made from the urethane polymer component, (f) a form for which a layer made from the urethane polymer component is formed on a portion or the entirety of a surface of fibers, and a fabric is formed from the fibers thereof, and (g) a form for which at least some of a plurality of fibers are made from a urethane polymer, and a fabric is formed from the fibers thereof. With respect to fabrics, a case in which all of the gaps between fibers are filled with a urethane polymer, a case in which some of the gaps between fibers are filled with a urethane polymer, and a case in which the gaps between fibers are not filled with a urethane polymer are possible.

Of the abovementioned forms, (a), (b), (d) and (e) correspond to aspects in which a urethane polymer component forms a layer on the substrate, and (c), (f) and (g) correspond to aspects in which the urethane polymer component is present on the substrate surface and internally.

The urethane polymer, which is a component that is present at least at a portion of the substrate surface, is a polymer having a urethane bond based on a reaction between an isocyanate group and a hydroxyl group. The urethane polymer may have in addition to the urethane bond, a urea bond based on a reaction between an isocyanate group and an amino group or water, or an amide bond based on a reaction between an isocyanate group and a carboxyl group. Further, the urethane polymer may also have an allophanate group based on a reaction between an isocyanate and a urethane bond, and a biuret group based on a reaction between an isocyanate group and a urea bond.

This urethane polymer has a chain extender-derived hard segment and a polyoxyalkylene polyol-derived soft segment.

According to the knowledge of the present inventors, while the soft segment exhibits an anchor effect, it cannot resolve the problem of stickiness, but the problem of stickiness can be resolved while maintaining the anchor effect by combining a polyoxyalkylene polyol-derived soft segment with a specific hard segment (chain extender-derived hard segment). In particular, the problem of stickiness does not occur even when unwinding immediately after coating and applying to the substrate. Furthermore, the urethane polymer component can be made present in a dried state at the entire substrate surface. Thus, in a case where a fabric or the like is used as the substrate, the urethane polymer component can be effectively fixed to the substrate surface. On the other hand, with a urethane polymer component not having a specific hard segment, stickiness is generated even in a case where the urethane polymer component is coated and applied to a substrate and dried. In particular, resolving the problem of stickiness immediately after drying is difficult.

Examples of the chain extender, which is a component for forming the hard segment, include (i) short chain (approximately 1 to 6 carbons) active hydrogen-containing compounds that are reactive with isocyanate, and (ii) reaction products (terminals may be isocyanate groups or active hydrogen groups) between this active hydrogen-containing compound and polyisocyanate.

Examples of (i) include organic compounds having 1 to 6 carbons and 2 active hydrogen groups, and this type of compound includes diols having 1 to 6 carbons, diamines having 1 to 6 carbons, and dicarboxylic acids having 1 to 6 carbons. Specific examples include ethylene glycol (ethanediol), propylene glycol (propanediol), butylene glycol (butanediol), neopentyl glycol, ethylenediamine (ethanediamine), propylenediamine (propanediamine), butylenediamine (butanediamine), oxalic acid, malonic acid, succinic acid, glutaric acid, and adipic acid.

With regard to the hard segment derived from a compound that is a chain extender (i), a skeleton containing a urethane bond formed via a reaction between the compound of (i) and a polyisocyanate corresponds to the hard segment, and when a compound of (ii) is used as the chain extender, the structure of the compound of (ii) itself functions as the hard segment.

Examples of (ii) include reaction products between diisocyanate and an organic compound having 1 to 6 carbons and two active hydrogen groups. The functional groups of the terminals can be made to be an isocyanate group and/or an active hydrogen group by varying the equivalent ratio of both compounds. Examples of this type of compound include adducts of two diisocyanate molecules per organic compound having 1 to 6 carbons and two active hydrogen groups. Examples include a reaction product of one mole of ethylene glycol and two moles of diisocyanate, a reaction product of one mole of butylene glycol and two moles of diisocyanate, and a reaction product of one mole of ethylenediamine and two moles of diisocyanate. These types of compounds are obtained by reacting two equivalents of isocyanate per one equivalent of an active hydrogen group, and therefore the terminal group is ordinarily an isocyanate group. Moreover, one equivalent or more of an active hydrogen group may be reacted with one equivalent of isocyanate to introduce an active hydrogen group at a terminal.

Examples of the polyoxyalkylene polyol, which is the component forming the soft segment, include polyoxyalkylene polyols with an alkylene portion having from 1 to 6 carbons, and preferably from 2 to 4 carbons. From the perspective of increasing the function as a soft segment, the molecular weight of the polyoxyalkylene polyol is preferably from 100 to 10000, and more preferably from 500 to 5000. As the polyoxyalkylene polyol, a polyoxyalkylene diol can be applied, and a polyoxyalkylene diol having an alkylene portion with from 2 to 6 carbons is preferable. Examples of this type of compound include polyoxyethylene glycol (polyethylene glycol), polyoxypropylene glycol (polypropylene glycol), and polyoxytetramethylene glycol (polytetramethylene ether glycol).

The urethane polymer is a polymer obtained from a chain extender, a polyoxyalkylene polyol, and a polyisocyanate, but a polyol (for example, a polyester polyol, a polycarbonate polyol, and a polycaprolactone polyol) besides the polyoxyalkylene polyol may also be used. A single type of each of the chain extender, the polyoxyalkylene polyol, the polyisocyanate, and the polyol besides polyoxyalkylene polyol may be used, or two or more types of each may be used in combination.

In a case where a compound of (i) is used as the chain extender to obtain a urethane polymer, a method is useful in which a urethane prepolymer is produced with a polyoxyalkylene polyol, another polyol that is added as necessary, and a polyisocyanate, and then the compound of (i) is reacted with the urethane prepolymer. On the other hand, in a case where a compound of (ii) is used as the chain extender to obtain a urethane polymer, a method can be adopted in which a polyoxyalkylene polyol, another polyol that is added as necessary, a polyisocyanate that is added as necessary, and the compound of (ii) are mixed and reacted. The number of equivalents of isocyanate and the number of equivalents of the active hydrogen may be determined according to the necessary physical properties and reactivity, and the number of equivalents of the active hydrogen is preferably made larger than the number of equivalents of isocyanate so that terminal isocyanate groups are not left on the urethane polymer.

The urethane polymer may be any of a solvent-based urethane polymer that is synthesized using an organic solvent, a solvent-free urethane polymer that is synthesized without a solvent, and a water-based urethane polymer that is synthesized using water as a medium. In a case where a urethane polymer component is coated onto a substrate and provided at a portion of the surface thereof, a solvent-based urethane polymer or a water-based urethane polymer can be used. Furthermore, in a case where a fabric or the like is used as the substrate, either of a solvent-based urethane polymer and a water-based urethane polymer can be used.

The type of water-based urethane polymer may be any of (1) a forcibly emulsified type, (2) a self-emulsifying type, and (3) a water-soluble type. The water-based urethane polymer may also be in the form of an emulsion (particle diameter of generally 1 μm or greater), a colloid (particle diameter of generally from 1 to 100 nm), or an aqueous solution (particle diameter of generally 1 nm or less).

(1) A forcibly emulsified type water-based urethane polymer is a water-based polyurethane that is manufactured by a method such as (1a) a method of aqueously dispersing a polyurethane solution (an organic solvent solution of a polyurethane that has been subjected to solution polymerization or a polyurethane that has been synthesized without a solvent), and then removing the solvent, and (1b) a method of aqueously dispersing an isocyanate prepolymer with an emulsifier, and extending the chain using a chain extender.

(2) A self-emulsified type water-based urethane polymer is a water-based polyurethane that is manufactured by a method such as (2a) a method of aqueously dispersing a polyurethane in which an ionic group has been introduced (the molecular weight may be increased with a solvent such as acetone, and the solvent may be removed after aqueous dispersion), and (2b) a method of aqueously dispersing an isocyanate prepolymer in which an ionic group has been introduced, and extending the chain using a chain extender.

(3) A water-soluble type water-based urethane polymer is a water-based urethane polymer that is manufactured by a method such as reacting a highly water-soluble polyol with a polyisocyanate that can maintain a high level of solubility in water even after urethanization.

The substrate including a urethane polymer component at the surface can be a film or fabric as described above, but is not limited thereto. Fabric means a fabric formed into a thin sheet shape using a plurality of fibers, and fabrics are classified into textiles, knits, lace, felt, nonwoven fabrics, and paper according to the production method. The adhesive sheet is affixed to various types of adherends and used, but for a case in which the adhesive sheet is affixed to skin, the adhesive sheet is required to follow the movement of the skin, and needs to be air permeable and moisture permeable. Therefore, in cases where the adhesive sheet is used in this type of application, use of a fabric as the substrate is suitable. For cases in which a fabric or the like is used as the substrate, the urethane polymer component can be effectively fixed to the substrate surface. When a specific nonwoven fabric or the like is used as the substrate, a characteristic of hand-tearability can also be imparted to the adhesive sheet.

A textile is a cloth that is obtained by weaving a warp and a weft, and a knit means a knitted fabric that is obtained by creating a loop from one or a plurality of threads, and then hooking the next thread on that loop to create a new loop. Lace refers to a fabric that is made into an openwork cloth-like form with one or a plurality of threads, and felt means a sheet that is obtained by thinly compressing animal hair fibers or the like into a sheet shape. A nonwoven fabric is a sheet obtained by entangling fibers without weaving (excluding paper, felt and knits). Nonwoven fabrics include nonwoven fabrics configured from short fibers (namely, staples) (short fiber nonwoven fabrics), and nonwoven fabrics configured from long fibers (namely, filaments) (long fiber nonwoven fabrics). Examples of short fiber nonwoven fabrics include generally carded nonwoven fabrics, airlaid nonwoven fabrics, and wet-type nonwoven fabrics. Examples of long fiber nonwoven fabrics include generally spun bond nonwoven fabrics and spunlace nonwoven fabrics. Examples of interfiber bonding in short fiber nonwoven fabrics and long fiber nonwoven fabrics include heat, adhesive resin, and hydrogen bonding between fibers that is the same as the interfiber bonding of paper and the like. Staples ordinarily have a fiber length of several hundred mm or less, but are not limited thereto.

In a case where the substrate is a film, the thickness is preferably from 12 to 250 μm, and the film may be a single layer film or a multilayer film. In a case where the substrate is a fabric, the basis weight is preferably from 10 to 300 g/m². The substrate may also be one that has been corona-treated.

To form the urethane polymer component on at least a portion of the surface of the substrate, a urethane polymer (may be any of an organic solvent solution, aqueous solution, aqueous dispersion, or molten substance) may be applied onto the substrate by a method such as coating, spraying, and melt extrusion casting. In addition, the substrate may be immersed in an organic solvent solution, aqueous solution, aqueous dispersion or molten substance of a urethane polymer. In a case where the substrate itself contains a urethane polymer, the substrate may be manufactured by mixing the polymer and the like configuring the substrate with the urethane polymer. In a case where the urethane polymer is a thermoplastic polyurethane, the urethane polymer component can be formed at least at a portion of the surface of the substrate by melt extrusion casting the thermoplastic polyurethane.

As described above, a nonwoven fabric can be used as the substrate, and for cases in which the substrate is a nonwoven fabric, the urethane polymer component can be formed at least at a portion of the surface of the substrate through the above-described methods, and a method like that described below.

Nonwoven fabrics can be manufactured using a melt blow device provided with an extruder, an extrusion chamber for molten thermoplastic material, and a melt blow die having a die orifice through which the molten thermoplastic material is extruded and a gas orifice through which gas (for example, hot air) is sprayed at a high speed. In this case, molten resin is extruded from the melt blow die to form melt blown fibers, the melt blown fibers are sprayed onto a rotating drum, the fibers are accumulated on the drum surface, and thereby a nonwoven fabric is obtained.

In this case, a plurality of melt blow dies can be used, a urethane polymer can be extruded from one of the plurality of melt blow dies to form urethane polymer fibers, which can then be entangled with other fibers, and thereby the urethane polymer component can be formed at least at a portion of the surface of the substrate. Furthermore, melt blow dies that can form fibers having a core-sheath structure may be used with the sheath being made of the urethane polymer component.

With the above-described method, a substrate including a urethane polymer component at least on a portion of the surface is obtained, but a silicone adhesive may be laminated so as to contact this urethane polymer component, thereby forming a silicone adhesive layer, and a targeted adhesive sheet can thereby be obtained.

The silicone adhesive is an adhesive containing a component having a polyorganosiloxane skeleton, and unmodified silicone (straight silicone), modified silicone and a combination thereof can be used as the component having a polyorganosiloxane skeleton.

Here, unmodified silicone refers to dimethyl silicone (silicone for which the polysiloxane side chains and terminals are all methyl groups), and modified silicone refers to a silicone for which at least some of the methyl groups have been substituted by other groups or atoms. The other groups or atoms can be categorized into reactive (reactive groups) and non-reactive (non-reactive groups), and an example of a modified silicone having a non-reactive group is methylphenyl silicone (for which some of the side chains of dimethyl silicone are phenyl groups), and an example of a modified silicone having reactive atoms is methyl hydrogen silicone (for which some of the side chains of dimethyl silicone are hydrogen atoms).

Modified silicone may have atoms or a group other than methyl at the side chains and/or terminals. Of these, reactive groups include an amino group, an epoxy group, a carbinol group, a vinyl group, a (meth)acryloyl group, a polyether group, a mercapto group, a carboxyl group, a phenol group, and a hydroxyl group, and an example of the reactive atom includes the above-described hydrogen atom (hydrogen modified). Examples of non-reactive groups include the above-described phenyl group, a long-chain alkyl group, and an aralkyl group.

Considering holding force and adhesive force, the silicone adhesive is preferably a crosslinked silicone adhesive. In this case, a component having a crosslinked structure is used as the component having a polyorganosiloxane skeleton. For example, a crosslinked structure can be introduced by using a modified silicone having a first reactive group and a silicone having a second reactive group, and chemically bonding the first and second reactive groups. An example of this is a case in which a silicone having a hydrogen atom at a side chain and/or terminal, and a silicone having a vinyl group at a side chain and/or terminal are bonded through a hydrosilylation reaction. A reaction catalyst may be used for a case in which a crosslinked structure is introduced using a reactive group in this manner.

The crosslinked structure can also be introduced through radiation crosslinking. Examples of radiation crosslinking include electron beam crosslinking and γ-beam crosslinking. In the case of introduction through radiation crosslinking, the silicone is not required to have a reactive group, and a reaction catalyst for crosslinking is not necessary.

To increase the adhesiveness of the silicone adhesive, the silicone adhesive may include a silicate adhesiveness imparting agent. As the silicate adhesiveness imparting agent, one which is configured from at least one of an M-unit (monovalent $R_3SiO_{1/2}$ unit), a D-unit (divalent $R_2SiO_{2/2}$ unit), a T-unit (trivalent $RSiO_{3/2}$ unit) and a Q-unit (tetravalent $SiO_{4/2}$ unit) is useful. R represents an alkyl group or aryl group, and a methyl group is preferable.

The silicate adhesiveness imparting agent are particularly preferably an MQ resin made from an M-unit and a Q-unit, an MQD resin made from an M-unit, a Q-unit, and a D-unit, and an MQT resin made from an M-unit, a Q-unit, and a T-unit. The number average molecular weight of the silicate adhesiveness imparting agent is typically from 100 to 50000.

In addition to the silicate adhesiveness imparting agent, the silicone adhesive may also include silicones (for example, oil, fluid, gum, and elastomer) of different molecular weights, a stabilizer, an antioxidant, a filler, and the like.

The adhesive sheet can be produced by fabricating through the above-described method a substrate including a urethane polymer component at least on a portion of the surface, applying a silicone adhesive so as to contact the urethane polymer component, volatilizing the solvent and the like as necessary, and according to the type of silicone adhesive, either not performing crosslinking, or performing radiation crosslinking or chemical crosslinking. The thickness of the silicone adhesive layer is preferably from to 10 to 1000 μm.

Although specific embodiments have been shown and described herein, it is understood that these embodiments are merely illustrative of the many possible specific arrangements that can be devised in application of the principles of the invention. Numerous and varied other arrangements can be devised in accordance with these principles by those of skill in the art without departing from the spirit and scope of the invention. The scope of the present invention should not be limited to the structures described in this application, but only by the structures described by the language of the claims and the equivalents of those structures.

EXAMPLES

Below are examples and comparative examples. The following urethane polymers 1 to 4 and polymers 1 to 4 were prepared. The urethane polymers 1 to 4 are urethane polymers having a chain extender-derived hard segment and a polyoxyalkylene polyol-derived soft segment. In the urethane polymers 1 to 4, the chain extender is a short chain diol.

Urethane polymer 1: Hydran WLI602 (from DIC Corp.)
Urethane polymer 2: Hydran WLS202 (from DIC Corp.)
Urethane polymer 3: Resamine D2040 (from Dainichiseika Color & Chemicals Mfg. Co., Ltd.)
Urethane polymer 4: Crisvon ASPU-112 (from DIC Corp.)
Polymer 1: PTMG2000 (polytetramethylene ether glycol, M.w.: 2000, from Mitsubishi Chemical Corporation)
Polymer 2: PTMG3000 (polytetramethylene ether glycol, M.w.: 3000, from Mitsubishi Chemical Corporation)
Polymer 3: Vylon 630 (amorphous polyester resin, from Toyobo Co., Ltd.)
Polymer 4: Vylon UR-8700 (polyester urethane resin, from Toyobo Co., Ltd.)

Solutions containing any of the urethane polymers 1 to 4 and polymers 1 to 4 for which the concentration of the nonvolatile portion had been adjusted with water or a solvent were used for application to the below-described substrates.

Adhesive Sheet Preparation

Example 1

A solution containing the urethane polymer 1 with the concentration of the nonvolatile portion adjusted to 5 mass % was uniformly coated onto a polyester/rayon nonwoven fabric substrate (from 3M) using a wire bar No. 10. After being coated, the substrate was fully dried in a 95° C. oven, and a substrate including the abovementioned polymer component at least at a portion of the surface was obtained.

A silicone-based adhesive composition prepared by a below-described method was uniformly coated at an amount of 50 g/m² onto the substrate including the polymer component. The substrate including the polymer component and onto which the silicone-based adhesive composition was applied was irradiated with an electron beam, after which the adhesive surface was covered with a fluorosilicone liner (trade name: MU, from Fujico Co., Ltd.) to thereby fabricate the adhesive sheet of Example 1. Electron beam irradiation was performed under a condition of 4.0 Mrad (210 keV) using an electron beam generating device (PCT, Davenport, Iowa).

The silicone-based adhesive composition was prepared by the following method. Namely, polydimethyl siloxane (trade name: TSF451 AK 1000,000 cs, from Momentive Performance Materials Japan LLC) and an MQ resin (trade name: MQ803TF, from Wacker Chemie AG) were mixed at a weight ratio (polydimethyl siloxane/MQ resin) of 77/23, and a silicone-based adhesive composition was thereby prepared.

Example 2

An adhesive sheet of Example 2 was fabricated in the same manner as Example 1 with the exception that a solution containing the urethane polymer 1 with the concentration of the nonvolatile portion adjusted to 10 mass % was used.

Example 3

An adhesive sheet of Example 3 was fabricated in the same manner as Example 1 with the exception that a solution containing the urethane polymer 1 with the concentration of the nonvolatile portion adjusted to 40 mass % was used.

Example 4

An adhesive sheet of Example 4 was fabricated in the same manner as Example 1 with the exception that a solution containing the urethane polymer 2 with the concentration of the nonvolatile portion adjusted to 10 mass % was used.

Example 5

An adhesive sheet of Example 5 was fabricated in the same manner as Example 1 with the exception that a solution containing the urethane polymer 3 with the concentration of the nonvolatile portion adjusted to 10 mass % was used.

Example 6

An adhesive sheet of Example 6 was fabricated in the same manner as Example 1 with the exception that a solution containing the urethane polymer 4 with the concentration of the nonvolatile portion adjusted to 10 mass % was used.

Comparative Example 1

An adhesive sheet of Comparative Example 1 was fabricated in the same manner as Example 1 with the exception that the substrate was used as is without being coated with a solution containing the urethane polymer 1.

Comparative Example 2

An amount of 12.7 g of a solution containing the polymer 1 with concentration of the nonvolatile portion adjusted to 40 mass % using isopropanol (IPA) was uniformly coated onto a 25×50 cm polyester/rayon nonwoven fabric substrate, and then fully dried in a 65° C. oven (approximately 10 g/m$^2$ (SQM)). After being coated, the substrate was fully dried in a 95° C. oven, and a substrate including the abovementioned polymer component at least at a portion of the surface was obtained. An adhesive sheet of Comparative Example 2 was fabricated in the same manner as Example 1 with the exception that the obtained substrate was used.

Comparative Example 3

An adhesive sheet of Comparative Example 3 was fabricated in the same manner as Comparative Example 2 with the exception that the polymer 2 was used.

Comparative Example 4

An adhesive sheet of Comparative Example 4 was fabricated in the same manner as Example 1 with the exception that a solution containing the polymer 3 with the concentration of the nonvolatile portion adjusted to 2 mass % was used.

Comparative Example 5

An adhesive sheet of Comparative Example 5 was fabricated in the same manner as Example 1 with the exception that a solution containing the polymer 4 with the concentration of the nonvolatile portion adjusted to 2 mass % was used.

Example 7

An adhesive sheet of Example 7 was fabricated in the same manner as Example 4 with the exception that a polyethylene terephthalate (PET) film was used as the substrate.

Example 8

An adhesive sheet of Example 8 was fabricated in the same manner as Example 5 with the exception that a polyethylene terephthalate (PET) film was used as the substrate.

Comparative Example 6

An adhesive sheet of Comparative Example 6 was fabricated in the same manner as Comparative Example 1 with the exception that a polyethylene terephthalate (PET) film was used as the substrate.

Example 9

An adhesive sheet of Example 9 was fabricated in the same manner as Example 2 with the exception that a soft polyvinyl chloride (soft PVC) film was used as the substrate.

Comparative Example 7

An adhesive sheet of Comparative Example 7 was fabricated in the same manner as Comparative Example 1 with the exception that a soft polyvinyl chloride (soft PVC) film was used as the substrate.

Anchoring Performance (Interfacial Adhesive Strength)

Figure 2:
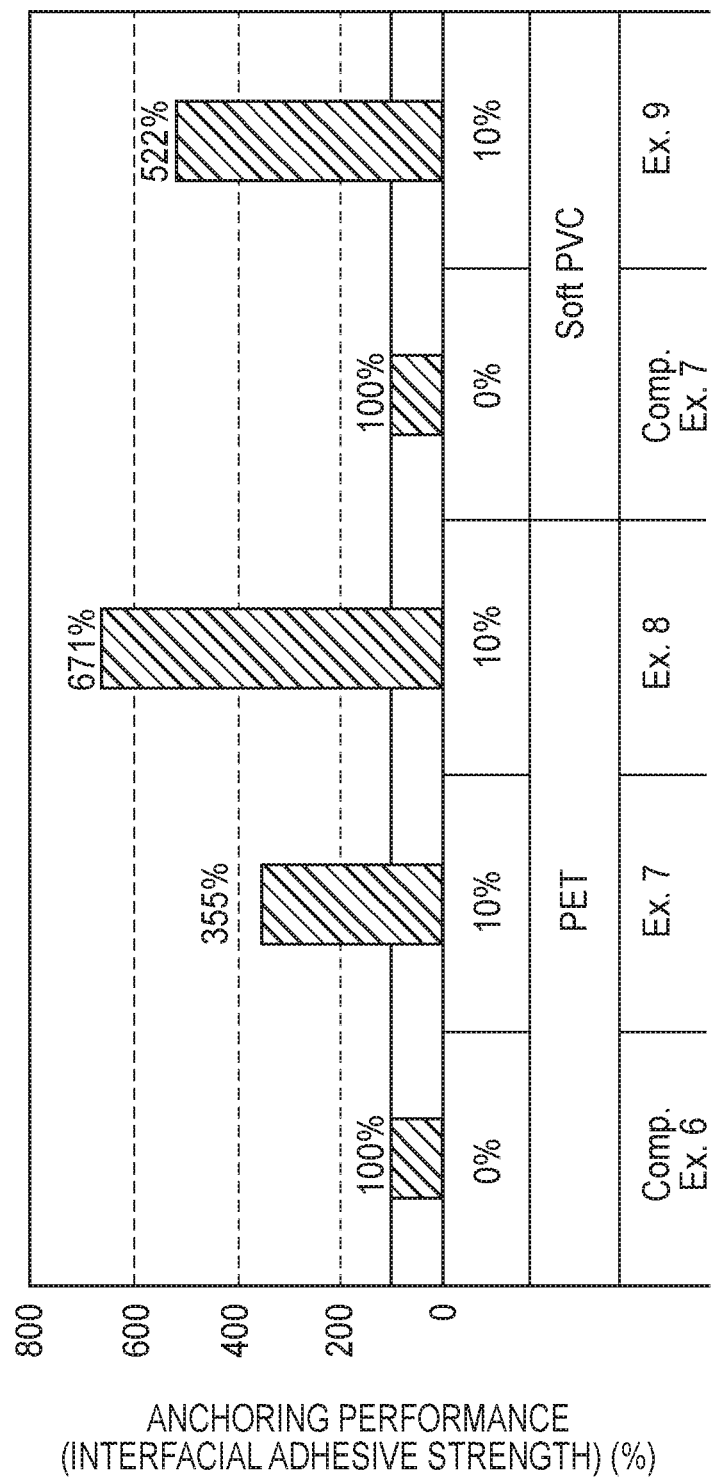
FIG. 2 is a graph showing the results of examples.

The anchoring performance was evaluated by measuring the interfacial adhesive strength between the adhesive and the substrate. First, the adhesive sheets of the examples and comparative examples were cut to 25 mm×70 mm, and a tab was created in each sheet by cutting inward a 25 mm×approximately 5 to 10 mm portion of the adhesive surface from the end. Next, the adhesive surface of a silicone tape (No. 8510, available from 3M), and the adhesive surface of an adhesive sheet of an example or comparative example were adhered, and pressure bonded using a 2 kg roller at a speed of 5 mm/second. The substrate side of the adhesive sheet was fixed to a flat surface with double-sided tape or the like, and the stress (interfacial adhesive strength) when the silicone tape was peeled off at an angle of 180° and a speed of 300 mm/minute was measured and recorded. FIG. 1 shows the results of the interfacial adhesive strength of each of the examples and comparative examples based on the interfacial adhesive strength of the adhesive sheet of Comparative Example 1 being 100%. FIG. 2 shows the results of the interfacial adhesive strength of each of the examples based on the interfacial adhesive strength of the adhesive sheet of Comparative Example 6 or 7 being 100%.

As shown in FIG. 1, for cases in which the substrate was a nonwoven fabric, the adhesive sheets of Examples 1 to 6 excelled in anchoring performance (interfacial adhesive strength) (in comparison to Comparative Examples 1 to 5). In addition, similar to the cases in which the substrate was a nonwoven fabric, the results show that even when PET or soft polyvinyl chloride was used, the adhesive sheets of the examples excelled in anchoring performance.

Stickiness Evaluation

Substrates including a polymer component at least at a portion of the surface of each of the Examples 1 to 6 and Comparative Examples 2 to 5 were obtained in the same manner as Examples 1 to 6 and Comparative Examples 2 to 5 with the exception of using, as the substrate, a polyethylene terephthalate (PET) film (Emblet S-38 polyester film from Unitika Ltd.) having a matte surface. In the stickiness evaluation, solutions respectively containing that abovementioned urethane polymers or the abovementioned polymers (polymer components) were coated onto the matte surface of the PET film.

Immediately after the substrates including the polymer component were removed from the oven, the substrates were positioned with the surface onto which the polymer component was coated oriented upward, and an untreated PET film was stacked thereon and pressure bonded (conditions: 2 kg roller, 50 mm/s per round trip). After pressure bonding, the untreated PET film was quickly peeled off from the substrate film by hand, and the transfer or lack of transfer of the polymer component to the untreated PET film was confirmed.

Cases for which the polymer component was not transferred to the untreated PET film were indicated by "Pass", and cases in which the polymer component was transferred were indicated by "Fail". The results are shown in Tables 1 and 2.

TABLE 1

|  | Example 1 | Example 2 | Example 3 | Example 4 | Example 5 | Example 6 |
|---|---|---|---|---|---|---|
| Stickiness Evaluation results | ○ | ○ | ○ | ○ | ○ | ○ |

TABLE 2

|  | Comparative Example 2 | Comparative Example 3 | Comparative Example 4 | Comparative Example 5 |
|---|---|---|---|---|
| Stickiness Evaluation results | x | x | ○ | ○ |

The invention claimed is:

1. An adhesive sheet comprising:
a substrate comprising a polyester and rayon, or a polyvinyl chloride;
a urethane polymer having a chain extender-derived hard segment and a polyoxyalkylene polyol-derived soft segment,
wherein the urethane polymer is in contact with at least a portion of the substrate; and
a silicone adhesive layer in contact with the urethane polymer,
wherein the adhesive sheet has greater interfacial adhesive strength between the substrate and silicone adhesive layer than compared to an adhesive sheet of the same components without the urethane polymer, according to the Anchoring Performance Test.

2. The adhesive sheet according to claim 1, wherein the chain extender is an organic compound having 1 to 6 carbons and 2 active hydrogen groups.

3. The adhesive sheet according to claim 1, wherein the polyoxyalkylene polyol is a polyoxyalkylene diol with an alkylene portion having from 2 to 6 carbons.

4. The adhesive sheet according to claim 1, wherein a layer of the urethane polymer is formed on the substrate.

5. The adhesive sheet according to claim 1, wherein urethane polymer is present on the surface of the substrate and within the substrate.

6. The adhesive sheet according to claim 1, wherein the substrate is a fabric.

7. The adhesive sheet according to claim 1, wherein the silicone adhesive is a crosslinked silicone adhesive.

8. The adhesive sheet according to claim 1, wherein the substrate is a nonwoven fabric.

9. The adhesive sheet according to claim 1, wherein the substrate is a polyester/rayon nonwoven fabric.

10. The adhesive sheet according to claim 1, wherein the hard segment is derived from one or more of a diol, a diamine, and a dicarboxylic acid, wherein the diol, the diamine, and the dicarboxylic acid comprise 1-6 carbons.

11. The adhesive sheet according to claim 1, wherein the hard segment is derived from a polyisocyanate and one or more of a diol, a diamine, and a dicarboxylic acid, wherein the diol, the diamine, and the dicarboxylic acid comprise 1-6 carbons.

12. The adhesive sheet according to claim 1, wherein the hard segment is derived from ethylene glycol, propylene glycol, butylene glycol, neopentyl glycol, ethylenediamine, propylenediamine, butylenediamine, oxalic acid, malonic acid, succinic acid, glutaric acid, or adipic acid.

13. The adhesive sheet according to claim 1, wherein the polyoxyalkylene polyol soft segment is derived from a polyoxyalkylene diol characterized by a molecular weight of 500 to 5000.

14. The adhesive sheet according to claim 1, wherein the polyoxyalkylene polyol soft segment is derived from a polyoxyalkylene diol selected from polyethylene glycol, polypropylene glycol, polytetramethylene ether glycol, and a combination thereof.

15. The adhesive sheet according to claim 1, wherein the silicon adhesive is derived from polydimethyl siloxane and an MQ resin.

* * * * *